(12) United States Patent
Rahalkar

(10) Patent No.: US 11,757,804 B2
(45) Date of Patent: Sep. 12, 2023

(54) COMPUTER-IMPLEMENTED METHOD AND A COMPUTER SYSTEM FOR IMPROVING PERFORMANCE OF A SERVICE REPRESENTATIVE

(71) Applicant: DATAGAMZ GLOBAL PTY LTD, Fitzroy (AU)

(72) Inventor: Kunal Rahalkar, Fitzroy (AU)

(73) Assignee: DATAGAMZ GLOBAL PTY LTD, Fitzroy (AU)

(*) Notice: Subject to any disclaimer, the term of this patent is extended or adjusted under 35 U.S.C. 154(b) by 0 days.

(21) Appl. No.: 17/066,729

(22) Filed: Oct. 9, 2020

(65) Prior Publication Data
US 2021/0112021 A1    Apr. 15, 2021

(30) Foreign Application Priority Data
Oct. 11, 2019    (AU) ................. 2019903836

(51) Int. Cl.
*H04L 51/02* (2022.01)
*A63F 13/80* (2014.01)
*H04M 3/51* (2006.01)
*G06F 40/279* (2020.01)

(52) U.S. Cl.
CPC ............ *H04L 51/02* (2013.01); *A63F 13/80* (2014.09); *G06F 40/279* (2020.01); *H04M 3/5191* (2013.01); *A63F 2300/8064* (2013.01); *H04M 2203/403* (2013.01)

(58) Field of Classification Search
CPC .. H04L 51/02; A63F 13/80; H04M 2203/403; H04M 3/5175; H04M 2203/401; G06Q 10/06398
USPC ............ 709/206, 207; 379/265.06, 265.07, 379/265.03, 265.05, 265.09
See application file for complete search history.

(56) References Cited

U.S. PATENT DOCUMENTS

| | | |
|---|---|---|
| 8,535,059 B1 | 9/2013 | Noble, Jr. et al. |
| 2009/0089138 A1 | 4/2009 | Minert et al. |
| 2013/0176413 A1 | 7/2013 | Lowry et al. |
| 2013/0216037 A1 | 8/2013 | Eicholz et al. |
| 2013/0290128 A1* | 10/2013 | Balamurugan .... G06Q 30/0282 705/26.4 |
| 2015/0185996 A1 | 7/2015 | Brown et al. |
| 2019/0132451 A1* | 5/2019 | Kannan ............. H04M 3/5235 |
| 2019/0217206 A1* | 7/2019 | Liu ...................... G06N 20/00 |
| 2019/0347326 A1* | 11/2019 | Kozhaya .............. G06F 40/35 |
| 2020/0311204 A1* | 10/2020 | Gupta ................... G06N 20/00 |

OTHER PUBLICATIONS

International-Type Search Report dated Nov. 1, 2019, issued in corresponding Australian Provisional Patent Application No. 2019903836.

* cited by examiner

*Primary Examiner* — Thjuan K Addy
(74) *Attorney, Agent, or Firm* — MYERS WOLIN, LLC

(57) ABSTRACT

A computer-implemented method for improving performance of a service representative that provides services. The method comprises determining a performance indicator representing performance of the service representative and if the performance indicator meets a condition, starting a computing process on a computing device to interact with the service representative in order to improve the performance of the service representative.

21 Claims, 14 Drawing Sheets

COMPUTER-IMPLEMENTED METHOD AND A COMPUTER SYSTEM FOR IMPROVING PERFORMANCE OF A SERVICE REPRESENTATIVE

TECHNICAL FIELD

The present invention relates to customer relationship and engagement management systems and in particular, although not exclusively, this invention relates to a computer-implemented method and a computer system for improving performance of a service representative that provides services.

BACKGROUND

Customer Relationship Management (CRM) is a tool to manage a company's interaction with current and potential customers. It uses data analysis about customers' history with the company to improve business relationships with the customers, specifically focusing on customer retention and ultimately driving sales growth. CRM increases conversion rate, customer success, retention and satisfaction.

Companies normally deploy some customer representatives or service representatives (these service representatives can be human agents or online chatbots) to perform certain customer service functions. For example, for a bank, the service representatives, who are hired by the bank and might work at the call centre or the bank branches, may chat with customers online or offline to introduce services provided by the bank to the customers. The performance of the service representatives can be measured by different Key Performance Indicators (KPI), e.g., After Call Work (ACW), Average Handle Time (AHT), Net Promoter Score (NPS), sales conversion rate, customer rating/feedback, etc.

The problem arises when the service representatives are not able to meet predefined targets of these KPIs. There are not many viable options available to improve the performance of the customer/service representatives. Some of these include theoretical training sessions which are not often useful and are often seen as a punishment by the service representatives. Aspects such as real-world scenario, practicality and regular monitoring on the development are missing from the existing solutions.

Therefore, there is a need for a computer-implemented method and a computer system for improving performance of a service representative that provides services, which does not suffer from the above-mentioned deficiencies.

Any discussion of the background art throughout the specification should in no way be considered as an admission that such background art is prior art nor that such background art is widely known or forms part of the common general knowledge in the field in Australia or worldwide.

SUMMARY

The present invention is described hereinafter by various embodiments. This invention may, however, be embodied in many different forms and should not be construed as limited to the embodiments set forth herein. Rather, the embodiments are provided so that this disclosure will be thorough and complete and will fully convey the scope of the invention to those skilled in the art.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others.

There is provided a computer-implemented method for improving performance of a service representative that provides services. The method comprises determining a performance indicator representing performance of the service representative. If the performance indicator meets a condition, the method starts a computing process on a computing device to interact with the service representative in order to improve the performance of the service representative.

It is advantageous that the performance indicators such as After Call Work (ACW), Average Handle Time (AHT), Net Promoter Score (NPS) etc. are regularly monitored. This helps monitor the performance as well as growth of the service representatives. Additionally, when the performance indicators of any of the service representative are outside a predetermined range, then the present invention enables training of the service representative irrespective of whether they are online chatbots or human agents.

In an example, the service representative is an online chatbot, and the online chatbot is trained by a human agent. Starting the computing process comprises sending a notification to an account associated with a human agent. The notification includes a reward indication indicating a reward for interacting with the online chatbot via the computing process. The method further comprises receiving a response indicating the human agent has agreed to interact with the online chatbot via the computing process, invoking the computing process for the human agent to interact with the online chatbot in order to improve the performance of the online chatbot; and storing the reward indication in the account associated with the human agent as the reward for interacting with the online chatbot via the computing process.

In another example, the service representative is a human agent and the human agent is trained by a computing process. Starting the computing process comprises sending a notification to an account associated with the human agent. The notification includes a reward indication indicating a reward for interacting with the computing process. The method further comprises receiving a response indicating the human agent has agreed to interact with the computing process, invoking the computing process for the human agent to interact with in order to improve the performance of the human agent; and storing the reward indication in the account associated with the human agent as the reward for interacting with the computing process.

In a further example, the service representative is a human agent and the human agent is trained by a further human agent. Starting the computing process comprises sending a notification to an account associated with the human agent. The notification includes a reward indication indicating a reward for interacting with a further human agent via the computing process. The method further comprises receiving a response indicating the human agent has agreed to interact with the further human agent via the computing process, invoking the computing process for the human agent to interact with the further human agent in order to improve the performance of the human agent, and storing the reward indication in the account associated with the human agent as the reward for interacting with the further human agent.

The computing process is an electronic game operated on the computing device.

Determining the performance indicator of the service representative comprises determining one or more of Key Performance Indicators (KPI) comprising After Call Work (ACW), Average Handle Time (AHT), Net Promoter Score (NPS).

Determining the performance indicator of the service representative comprises obtaining a conversation between the service representative and a customer; and determining the performance indicator of the service representative based on the conversation between the service representative and the customer.

Determining the performance indicator of the service representative comprises identifying at least one keyword in the conversation, the at least one keyword representing a reaction from the customer in the conversation; and determining the performance indicator of the service representative based on the at least one keyword in the conversation.

Determining the performance indicator of the service representative comprises identifying a question asked by the customer and an answer provided by the service representative to the question; determining accuracy of the answer to the question; and determining the performance indicator of the service representative based on the accuracy of the answer to the question.

A computer system for improving performance of a service representative that provides services is provided. The computer system comprises a memory unit configured to store machine-readable instructions; and a processor operably connected with the memory unit. The processor obtains the machine-readable instructions from the memory unit. Further, the processor is configured by the machine-readable instructions to determine a performance indicator representing performance of the service representative; and if the performance indicator meets a condition, start a computing process on a computing device to interact with the service representative in order to improve the performance of the service representative.

In an example, the service representative is an online chatbot and the online chatbot is trained by a human agent. The processor is configured to start the computing process by sending a notification to an account associated with a human agent. The notification includes a reward indication indicating a reward for interacting with the online chatbot via the computing process. The processor is further configured to receive a response indicating the human agent has agreed to interact with the online chatbot via the computing process, invoke the computing process for the human agent to interact with the online chatbot in order to improve the performance of the online chatbot, and store the reward indication in the account associated with the human agent as the reward for interacting with the online chatbot via the computing process.

In another example, the service representative is a human agent and the human agent is trained by a computing process. The processor is configured to start the computing process by sending a notification to an account associated with the human agent. The notification includes a reward indication indicating a reward for interacting with the computing process. The processor is further configured to receive a response indicating the human agent has agreed to interact with the computing process, invoke the computing process for the human agent to interact with in order to improve the performance of the human agent, and store the reward indication in the account associated with the human agent as the reward for interacting with the computing process.

In a further example, the service representative is a human agent and the human agent is trained by a further human agent. The processor is configured to start the computing process by sending a notification to an account associated with the human agent. The notification includes a reward indication indicating a reward for interacting with a further human agent via the computing process. The processor is further configured to receives a response indicating the human agent has agreed to interact with the further human agent via the computing process, invoke the computing process for the human agent to interact with the further human agent in order to improve the performance of the human agent, and store the reward indication in the account associated with the human agent as the reward for interacting with the further human agent.

The computing process is an electronic game operated on the computing device.

The processor is configured to determine the performance indicator of the service representative by determining one or more of Key Performance Indicators (KPI) comprising After Call Work (ACW), Average Handle Time (AHT), Net Promoter Score (NPS).

The processor is configured to determine the performance indicator of the service representative by obtaining a conversation between the service representative and a customer; and determining the performance indicator of the service representative based on the conversation between the service representative and the customer.

The processor is configured to determine the performance indicator of the service representative by identifying at least one keyword in the conversation, the at least one keyword representing a reaction from the customer in the conversation; and determining the performance indicator of the service representative based on the at least one keyword in the conversation.

The processor is configured to determine the performance indicator of the service representative by identifying a question asked by the customer and an answer provided by the service representative to the question; determining accuracy of the answer to the question and determining the performance indicator of the service representative based on the accuracy of the answer to the question.

There is provided a non-transitory computer readable medium storing a set of computer readable instructions, the set of computer readable instructions configuring a computing device to perform any one of the methods described above.

BRIEF DESCRIPTION OF DRAWINGS

At least one example of the present invention will be described with reference to the accompanying drawings, in which.

It should be noted in the accompanying drawings and description below that like or the same reference numerals in different drawings denote the same or similar elements.

DESCRIPTION OF EMBODIMENTS

Figure 1A:
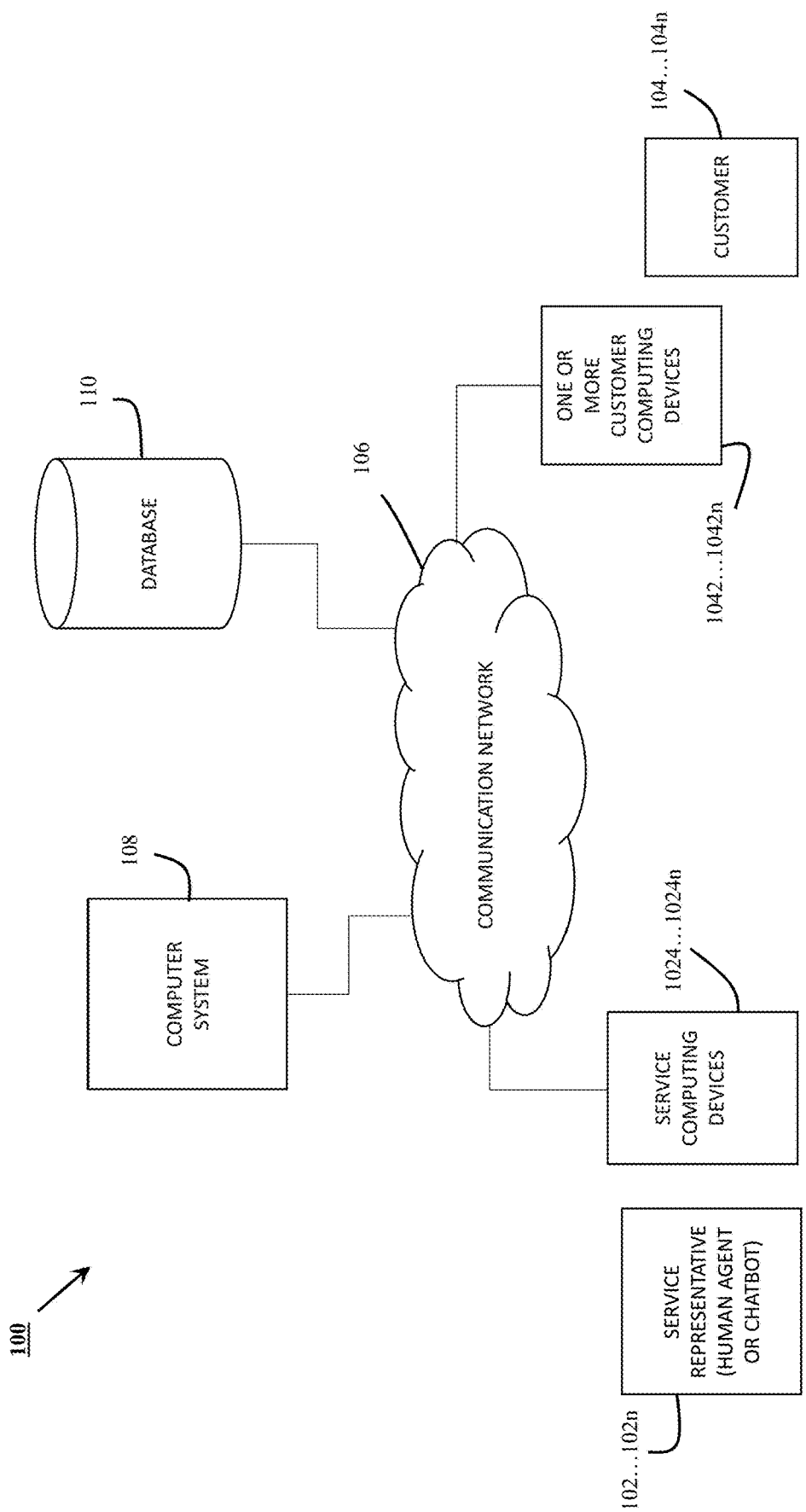
FIG. 1A illustrates an exemplary environment for improving performance of a service representative that provides services, in which various embodiments of the present invention may be implemented.

FIG. 1A illustrates an exemplary environment 100 for improving performance of a service representative that provides services, in which various embodiments of the present invention may be implemented. As shown in FIG. 1A, the environment 100 comprises a computer system 108, a database 110, one or more customer computing devices 1042 ... 1042n used by one or more customers 104 ... 104n and one or more service computing devices 1024 ... 1024n used by one or more service representatives 102 ... 102n to provide services, all connected with each other via a communication network 106.

The communication network 106 may be implemented through one or more of a plurality of protocols, such as, but not limited to, Ethernet, Wi-Fi, Bluetooth, ZigBee, Global System for Mobile communication (GSM) and Code-division multiple access (CDMA) etc. Further, the communication network 106 may be a Local Area Network (LAN) or a Wide Area Network (WAN). In an example, the communication network 106 is the Internet.

Further the database 110 may be a cloud-based storage or a local storage. In any manner, the database 110 is envisaged to be capable of providing the data to any of the computing devices connected with the communication network 106, when the data is queried appropriately using applicable security and other data transfer protocols.

For the purpose of present invention, it is envisaged that each of the one or more customers 104 ... 104n have associated one or more customer computing devices 1042 ... 1042n and the one or more service representatives 102 ... 102n have associated one or more service computing devices 1024 ... 1024n, to facilitate communication. Each of the one or more service computing devices 1024 ... 1024n and the one or more customer computing devices 1042 ... 1042n may be a laptop, a desktop PC or a handheld computing device such as smartphone, tablet etc. The service representative of the one or more service representatives 102 ... 102n, may be an online chatbot or a human agent. The human agent in the present disclosure in the present disclosure refers to a person (a human being) that is able to communicate with another person based on the person's knowledge. The online chatbot in the present disclosure refers to a computer program that is able to simulate a person (a human being) in communicating with another person based on one or more computer algorithms (for example, artificial intelligence algorithms, machine-learning algorithms) implemented in the computer program.

Figure 1B:
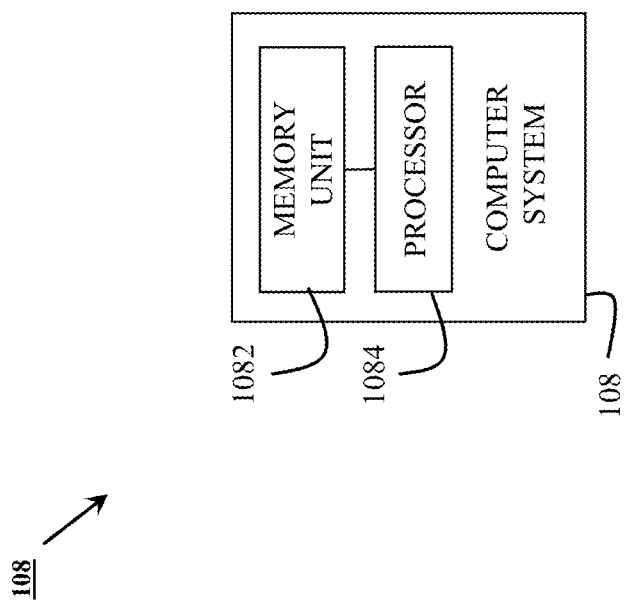
FIG. 1B illustrates an exemplary computer system of FIG. 1A, in accordance with an embodiment of the present invention.

As shown in FIG. 1A, further connected to the communication network 106 is the computer system 108. It is envisaged that the computer system 108 has computing capabilities. FIG. 1B illustrates an exemplary computer system 108 of FIG. 1A in accordance with an embodiment of the present invention. The computer system 108 includes a memory unit 1082 and a processor 1084 operably connected with the memory unit 1082. The memory unit 1082 may be a non-volatile memory unit, such as, but not limited to, EPROM, Electrically Erasable Programmable Read-Only Memory (EEPROM) and Flash Memory. The processor 1084 may be for example, a general-purpose processor, an Application Specific Integrated Circuit (ASIC) or a Field Programmable Gate Array (FPGA), etc. The memory unit 1082 is configured to store machine readable instructions. The machine-readable instructions may be loaded into the memory unit 1082 from a non-transitory computer readable medium.

Figure 2A:
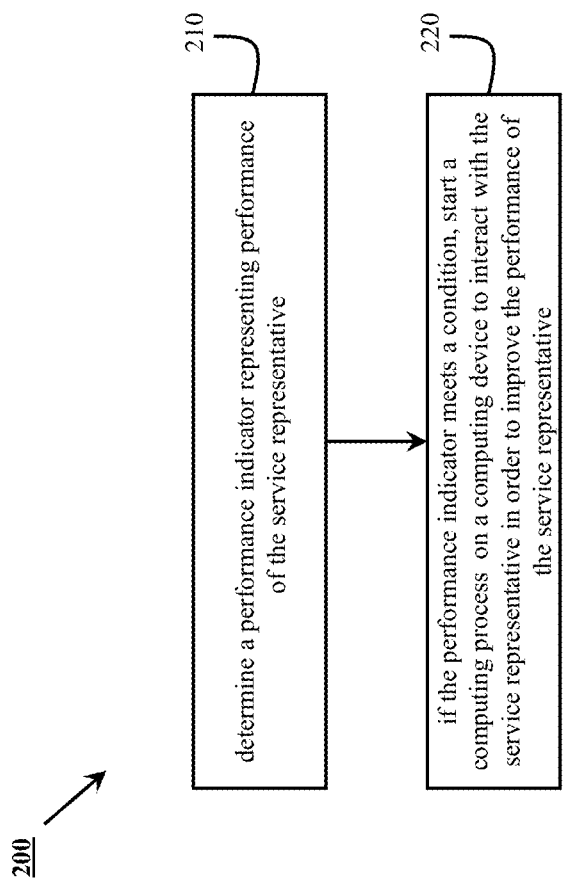
FIG. 2A illustrates a computer-implemented method for improving performance of a service representative that provides services, in accordance with an embodiment of the present invention.

FIG. 2A illustrates a computer-implemented method 200 for improving performance of a service representative that provides services in accordance with an embodiment of the present invention. The computer-implemented method 200 and other method steps described in the present disclosure can be a computer program. The computer program is stored in a non-transitory computer readable medium as computer-readable instructions. When read from the non-transitory computer readable medium by the computer system 108, the computer-readable instructions configure the processor 1084 of the computer system 108 to implement the method 200 and other method steps described in the present disclosure.

As shown in FIG. 2A, the processor 1084 at step 210 determines a performance indicator representing performance of the service representative (not shown in FIG. 2A). As described above, the one or more service representatives (102 ... 102n) may be an online chatbot or a human agent.

The performance of the service representative 102 can be measured by utilising different Key Performance Indicators (KPI). In general, the Key Performance Indicators (KPIs) are business metrics used by corporate executives and other managers to track and analyze factors deemed crucial to the success of an organization. Effective KPIs focus on the business processes and functions that senior management sees as most important for measuring progress toward meeting strategic goals and performance targets. KPIs may differ from organization to organization based on business priorities. For example, one of the key performance indicators for a public company is its stock price, while a KPI for a privately held startup may be the number of new customers each quarter.

KPIs are meant to indicate how well a business is doing. Without KPIs, it would be difficult for a company's leaders to evaluate that in a meaningful way, and to then make operational changes to address performance problems. Keeping employees focused on business initiatives and tasks that are central to organizational success could also be challenging without designated KPIs to reinforce the importance and value of those activities.

Examples of KPI may include, but not limited to, After Call Work (ACW), Average Handle Time (AHT), Net Promoter Score (NPS), sales conversion rate, customer rating/feedback, etc.

The After Call Work (ACW) includes all of the tasks required from service and sales representatives after a call has ended such as, but not limited to, logging a call disposition code, writing call notes, updating information in a CRM or helpdesk, providing feedback on customer sentiment or sending an email to the caller. There is no standard amount of time that should be allotted for after call work because the circumstances of every call centre are different. As a general rule of thumb, after call work should be as short as possible while still allowing for accurate completion of after call tasks.

Further, the Average handle time (AHT) is a call centre metric for the average duration of one transaction, typically measured from the customer's initiation of the call and including any hold time, talk time and related tasks that follow the transaction. AHT is a prime factor when deciding call centre staffing levels.

Furthermore, The Net Promoter Score (NSP) is an index ranging from −100 to 100 that measures the willingness of customers to recommend a company's products or services to others. It is used as a proxy for gauging the customer's overall satisfaction with a company's product or service and the customer's loyalty to the brand.

In general, for calculation of NPS, the customers are surveyed on one single question. They are asked to rate on an 11-point scale the likelihood of recommending the company or brand to a friend or colleague. For e.g.: "On a scale of 0 to 10, how likely are you to recommend this company's product or service to a friend or a colleague?" Based on their rating, customers are then classified in 3 categories: detractors, passives and promoters.

DETRACTORS—'Detractors' give a score lower or equal to 6. They are not particularly thrilled by the product or the service. They, with all likelihood, won't purchase again from the company, could potentially damage the company's reputation through negative word of mouth.
PASSIVES—'Passives' give a score of 7 or 8. They are somewhat satisfied but could easily switch to a competitor's offering if given the opportunity. They probably wouldn't spread any negative word-of-mouth but are not enthusiastic enough about your products or services to actually promote them.
PROMOTERS—'Promoters' give a score of 9 or 10. They love the company's products and services. They are the repeat buyers, are the enthusiastic evangelist who recommends the company products and services to other potential buyers.

So, the Net Promoter Score (NPS) is determined by subtracting the percentage of customers who are detractors from the percentage who are promoters. What is generated is a score between −100 and 100 called the Net Promoter Score. At one end of the spectrum, if when surveyed, all of the customers gave a score lower or equal to 6, this would lead to a NPS of −100. On the other end of the spectrum, if all of the customers were answering the question with a 9 or 10, then the total Net Promoter Score would be 100.

The conversion rate is a measure of the effectiveness of a service representative (or a sales team) in converting leads into sales. It is the number of conversions divided by the total number of leads. For example, if a service representative receives 200 leads in a month and 50 out of the 200 leads are converted to sales, the conversion rate would be 50 divided by 200, or 25%.

Additionally, the customer rating or customer satisfaction rating is often a leading indication as to the success (or failure) of a brand's Customer Relationship Management program. A Customer Satisfaction Rating is generally measured on a five-point scale (with 1 being "very dissatisfied" and 5 representing "very satisfied). The ratings may be for a quality of customer's interaction with a service/customer care representative or a service or a product. When reported on the individual level, a respondent's individual 1-5 selection is the reported metric. When reported on the aggregate level, individual responses are summed and reported as a percentage of the total collected responses over the course of a predetermined time frame.

The data related to the client engagement process is stored in the database 110, and the KPIs are calculated based on the data. In order to improve the level of customer service, the KPIs associated with each of the service representatives are calculated/determined, recorded and monitored. The processor 1084 of the computer system 108 compares the determined performance indicator with a corresponding predetermined (benchmark/threshold) value or range.

Returning to FIG. 2A, if the performance indicator meets a condition, then at step 220, the processor 1084 starts a computing process on a computing device that can be accessed by the service representative to interact with the service representative in order to improve the performance of the service representative. The condition may be, but not limited to, the determined performance indicator not being within the predetermined range or value. The condition would be met, if the performance indicator hits a target or threshold, for example, if the AHT is higher than predetermined range, say 0-30 minutes; the NPS is lower than a predetermined value, say, 10; the sales conversion rate is less than a predetermined value 20%. In that case, the processor 1084 starts a computing/training process to train the service representative 102 of the one or more service representatives 102 . . . 102*n*. The computing process may be an electronic game such as, but not limited to, an online quiz game. The use of the electronic game or quiz game is able to make the training process more engaging so as to improve the outcome of the training process.

Figure 2B:
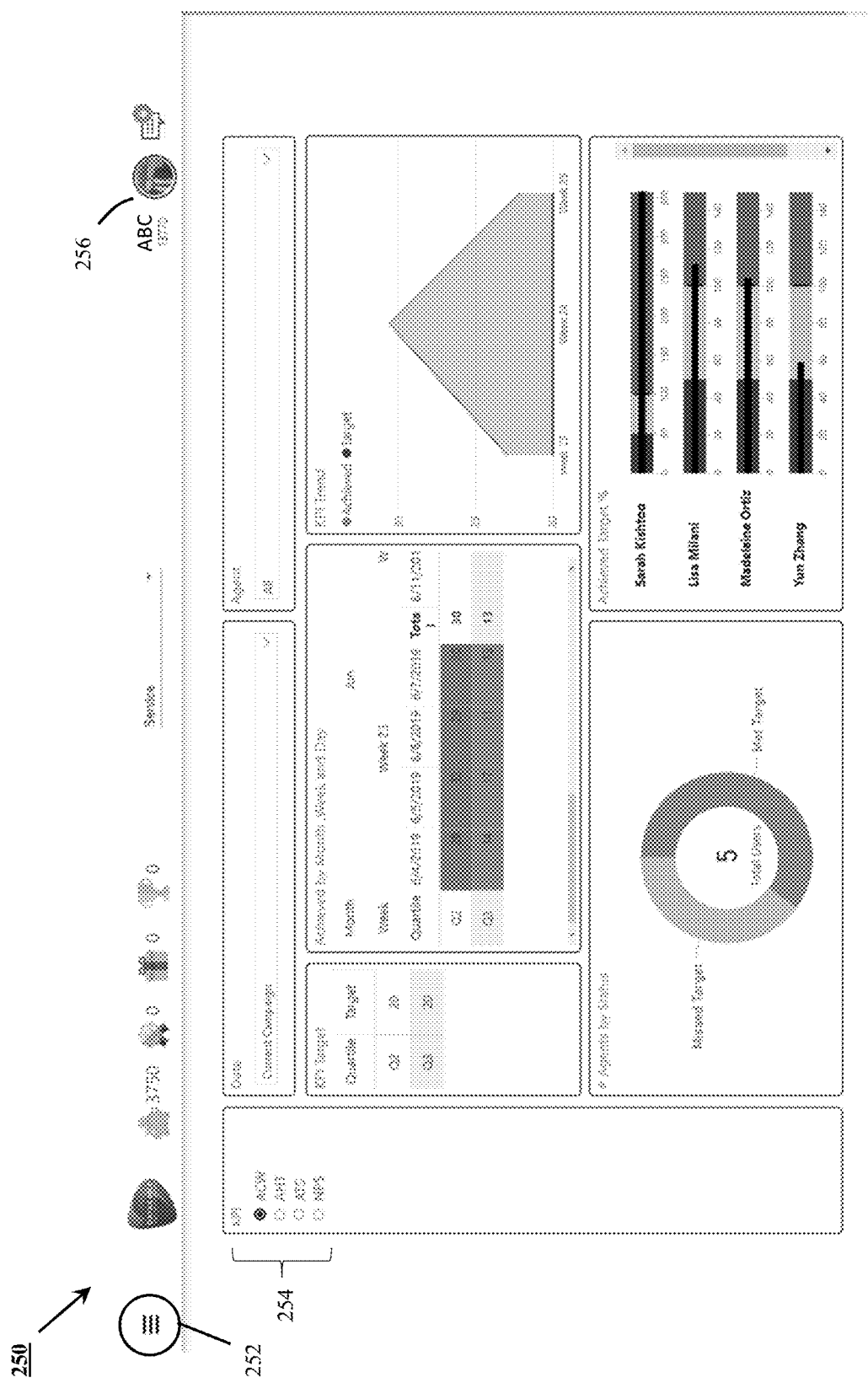
FIGS. 2B and 2C illustrate an exemplary graphical user interface of the computer system, in accordance with an embodiment of the present invention.

In another example, the performance of each of the one or more service representatives 102 . . . 102*n* can be monitored by a team leader from an exemplary user interface 250 illustrated in FIG. 2B. As shown in FIG. 2B, the different performance indicators 254 have been illustrated on the left and the ACW is selected. So, the performance data of the service representatives 102 . . . 102*n* (for example, Sarah Kishtoo, Lisa Milani, Madeleine Ortiz, Yun Zhang, etc., as shown in FIG. 2B) has been determined and displayed. The data is recorded on a daily basis and the performance indicators 254 may be determined weekly, monthly, quarterly etc. using the recorded data. It also illustrates exactly which service representatives of the one or more service representatives 102 . . . 102*n* have met the KPI targets and which haven't.

Figure 2C:
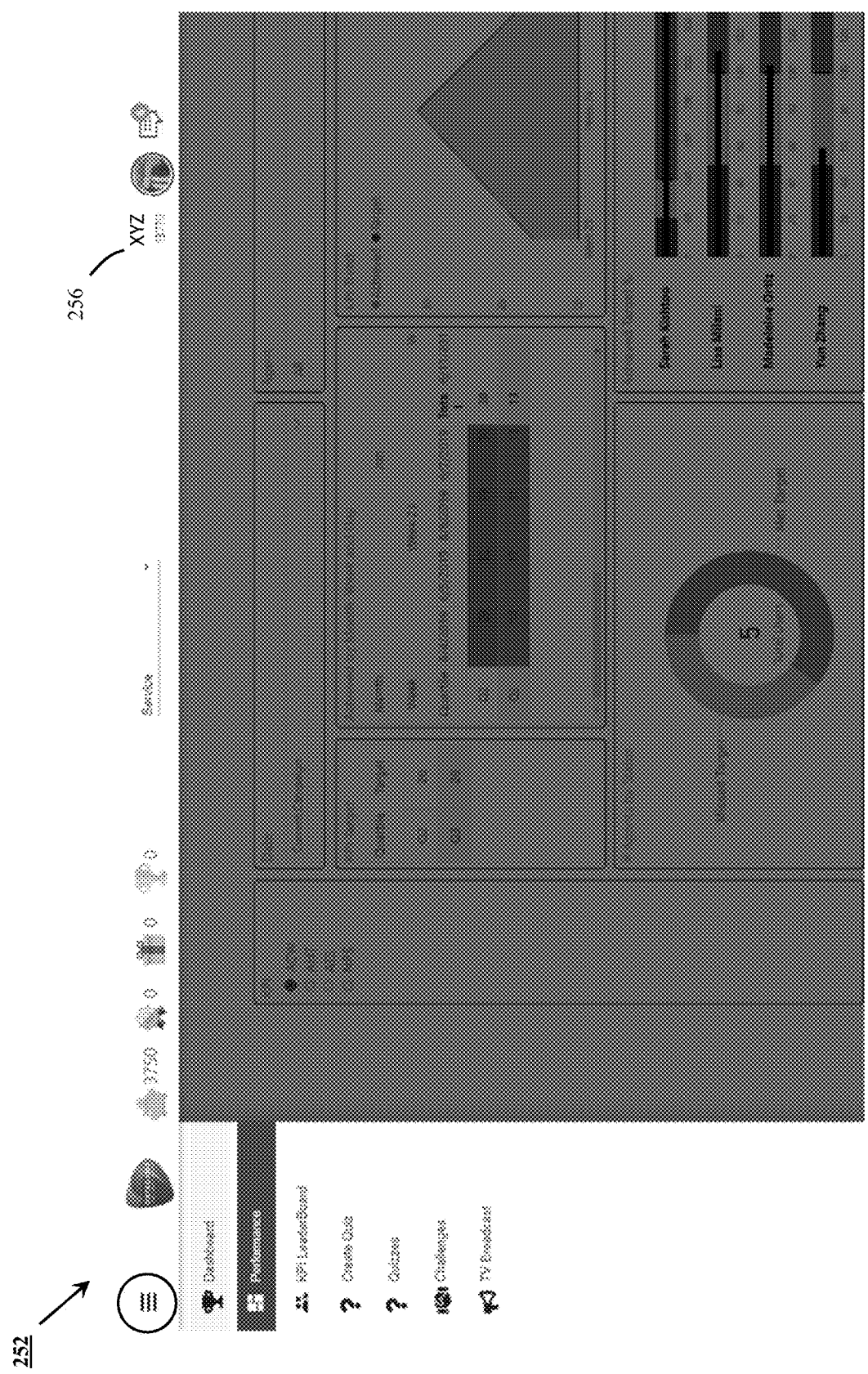

The menu option 252 on the top left of FIG. 2B provides multiple options for the team leader 256 to access. The same has been illustrated in FIG. 2C. As shown in FIG. 2C, apart from viewing the performance, the user interface 250 also has options for creating and accessing the quizzes for the training the one or more service representatives 102 . . . 102*n*, throwing challenges to team members (i.e., service representatives), TV broadcast, view leaderboard etc.

Once the team leader 256 identifies that a service representative 102 of the one or more service representatives 102 . . . 102*n* does not meet the KPI target, the team leader 256 instructs the processor 1082 to start the computing process to train the service representative.

Figure 3A:
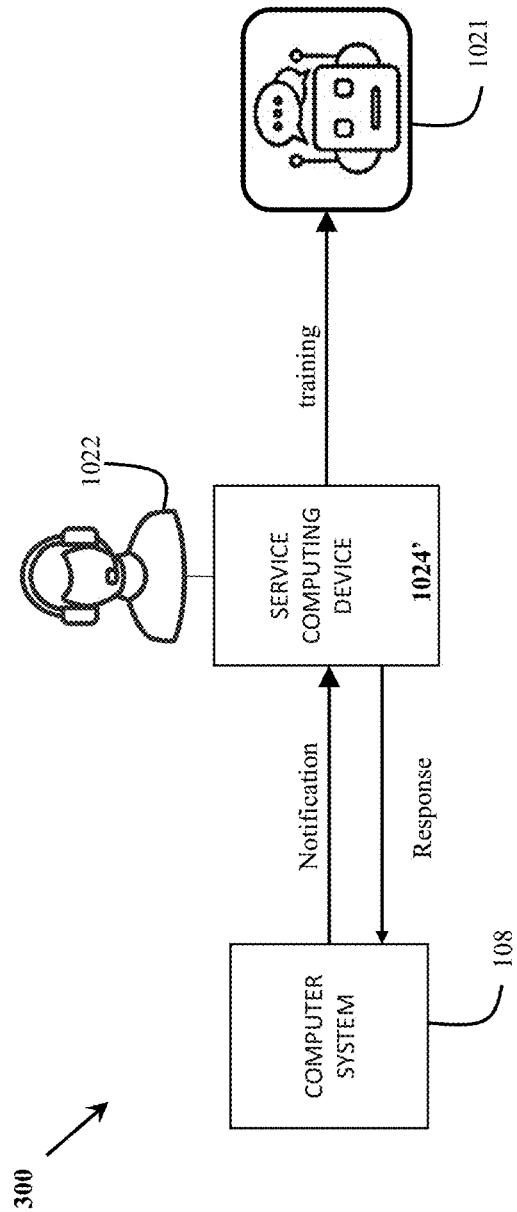
FIGS. 3A-3B illustrate a scenario where the service representative to be trained is an online chatbot and the online chatbot is trained by a human agent in accordance with an embodiment of the present invention.
Figure 3B:
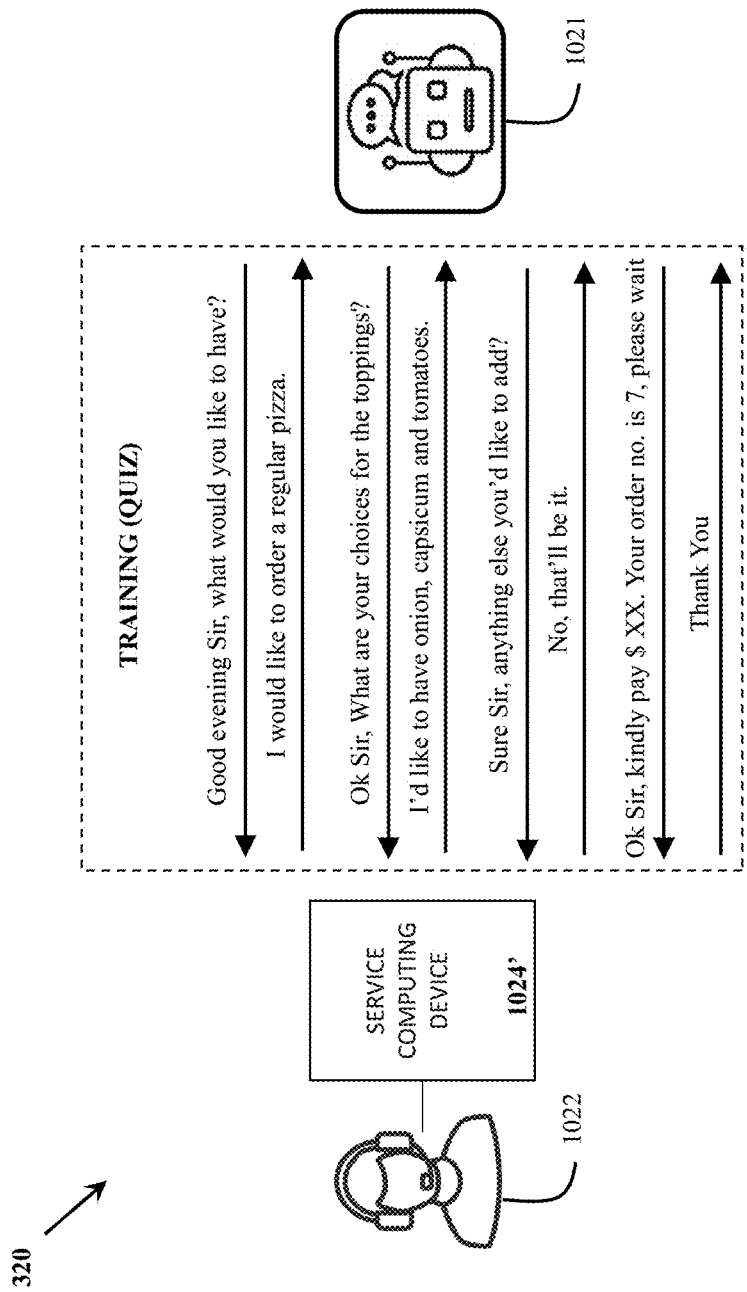

FIG. 3A-3B illustrate a scenario where the service representative 102 to be trained is an online chatbot 1021 and the online chatbot 1021 is trained by a human agent 1022. As shown in FIG. 3A, if the computer system 108 determines that a computing process or a training process needs to be started to train the online chatbot 1021, the computer system 108 sends a notification to an account associated with a human agent 1022. The notification includes a reward indication indicating that a reward would be provided for interacting with the online chatbot 1021 via the computing process. The human agent 1022 logs in the account using a service computing device 1024' and responds to the notification. If the human agent 1022 agrees to participate in the computing process, for example, an electronic game, to train the online chatbot 1021, the human agent 1022 uses the service computing device 1024' to send a response to the computer system 108. After the response is received from the service computing device 1024', indicating the human agent 1022 has agreed to interact with the online chatbot 1021 via the computing process. The computer system 108 invokes the computing process on the service computing device 1024' used by the human agent 1022 for the human agent 1022 to interact with the online chatbot 1021 in order to improve the performance of the online chatbot 1021. The computing process may be the electronic game such as a quiz etc. to improve the way the chatbot 1021 interacts with a customer (not shown in FIGS. 3A-3D) in order for the chatbot 1021 to meet the relevant KPI target. One such exemplary quiz is shown in FIG. 3B.

As shown in FIG. 3B, the online chatbot 1021 acts as a service representative at a pizza delivery website and the human agent 1022 using the service computing device 1024', acts as a customer. It should be noted that the online chatbot 1021 itself may be a machine learning process implemented on the computer system 108 or a separate computer. During the computing process, online chatbot 1021 asks questions depending on the context and the human agent 1022 provides answers to the questions, which may trigger more questions from the online chatbot 1021 until the sales process is finished. The human agent 1022 may also provide more appropriate answers that suit the context for the online chatbot 1021 to learn. As a result, the online chatbot 1021 can apply the knowledge learnt from the human agent 1022 to a real customer service process. This would improve customer experience of the customers and the performance of the online chatbot 1021.

Once the training is complete, the human agent 1022 is provided with the reward. Specifically, the computer 108 stores the reward indication in the account associated with the human agent 1022 as the reward for interacting with the online chatbot 1021 via the computing process.

Figure 3C:
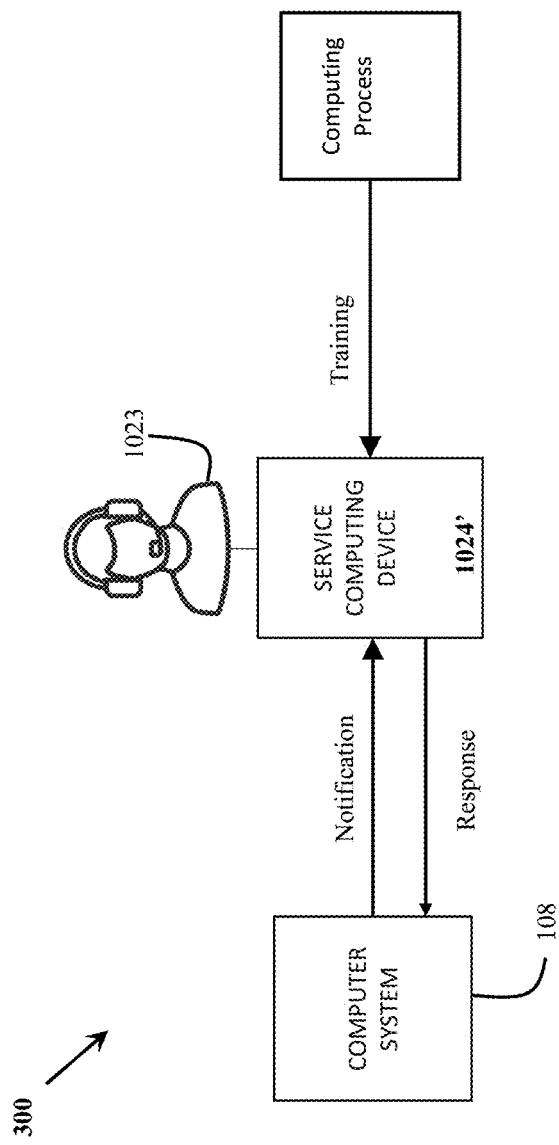
FIG. 3C illustrates a scenario where the service representative to be trained is a human agent and the human agent is trained by a computing process in accordance with an embodiment of the present invention.

FIG. 3C illustrates a scenario in accordance with the present invention where the service representative to be trained is a human agent 1023 and the human mange 1023 is trained by a computing process. If the computer system 108 determines that a computing process or a training process needs to be started to train the human agent 1023, the computer system 108 sends a notification to an account associated with the human agent 1023. The notification may include a reward indication indicating that a reward would be provided for interacting with the computing process. The human agent 1023 logs in the account using the service computing device 1024' and responds to the notification. If the human agent 1023 agrees to participate in the computing process, for example, an electronic game, to be trained, the human agent 1023 uses the service computing device 1024' to send a response to the computer system 108. After the response is received from the computer system 108 indicating the human agent 1023 has agreed to interact with the computing process, the computer system 108 invokes the computing process, for example, an electronic game, on the service computing device 1024' for the human agent 1023 to play in order to improve the performance of the human agent 1023. After the training is complete, the computer system 108 stores the reward indication in the account associated with the human agent 1023 as the reward for interacting with the computing process, i.e., playing the electronic game or being trained. The computing process may be an electronic game where a virtual customer simulated in the electronic game communicates with the human agent 1023 to improve the way the human agent 1023 interacts with a customer. This way, the human agent 1023 is able to improve performance during a real customer service session in the future and the training session helps the human agent 1023 meet the relevant KPI target.

Figure 3D:
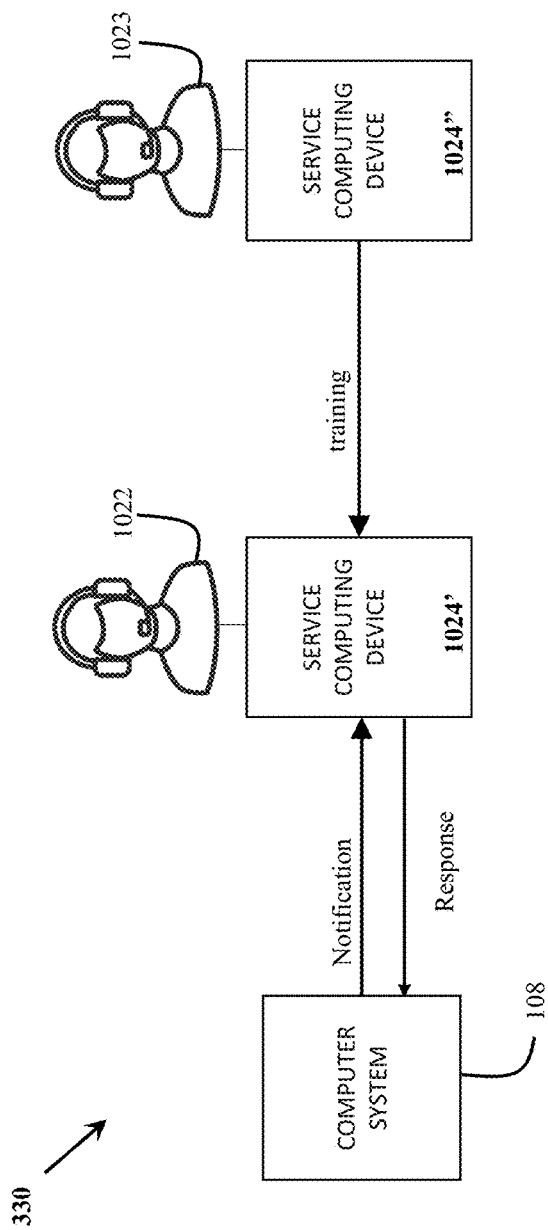
FIGS. 3D-3E illustrate a scenario where the service representative to be trained is a human agent and the human agent is trained by a further human agent in accordance with an embodiment of the present invention.
Figure 3E:
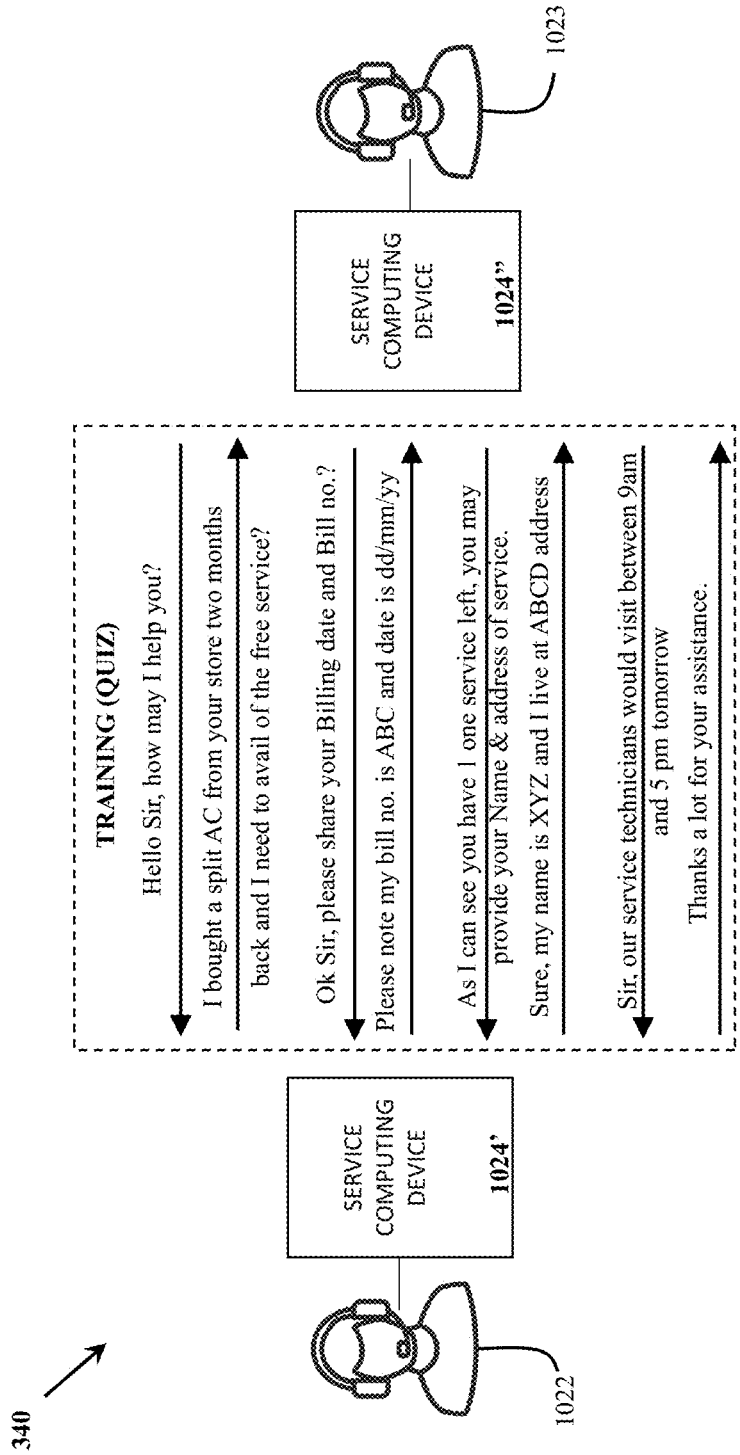

FIG. 3D-3E illustrate an embodiment in accordance with the present invention where the service representative to be trained is a human agent 1022 and the human agent 1022 is trained by a further human agent 1023. As shown in FIG. 3E, if the computer system 108 determines that a computing process or a training process needs to be started to train the human agent 1022, the computer system 108 sends a notification to an account associated with the human agent 1022. The notification may include a reward indication indicating that a reward would be provided for interacting with the further human agent 1023 via the computing process. The human agent 1022 logs in the account using the service computing device 1024' and responds to the notification. If the human agent 1022 agrees to participate in the computing process, for example, an electronic game, to be trained, the human agent 1022 uses the service computing device 1024' to send a response to the computer system 108. After the response is received from the service computing device 1024', indicating the human agent 1022 has agreed to interact with the further human agent 1023 via the computing process, the computer system 108 invokes the computing process for the human agent 1022 to interact with the further human agent 1023 in order to improve the performance of the human agent 1022. The computing process may be the electronic game such as a quiz to see how the human agent 1022 interacts with a customer so as to know how to improve the customer service skills of the human agent 1022, or to demonstrate how the further human agent 1023 interacts with a customer in an appropriate way. One such exemplary quiz is shown in FIG. 3E.

As shown in FIG. 3E, the further human agent 1023 uses the service computing device 1024" to send one or more questions to the service computing device 1024' being used by the human agent 1022. Once the question is received at the service computing device 1024'. The human agent 1022 provides answers to the questions and sends the answers back to the service computing device 1024" for the further human agent 1023 to review. In this particular example, the further human agent 1023 acts as a service representative for air conditioners at an electronics store and the human agent 1022 to be trained acts as a customer. The further human agent 1023 may train the human agent 1022 to confirm some essential details of the bill, such as brand and capacity of the AC, address of the delivery etc. before finishing the conversation because there might be a chance the wrong bill is being referred by mistake (possible human/computer error as there may be a number of sales on a same day). And if that happens then the technicians of some other brand of AC may be sent for service as details of some other bill had been referred and this would cause inconvenience to the company as well as the customer.

After the training session is complete, the computer system 108 stores the reward indication in the account associated with the human agent 1022 as the reward for interacting with the further human agent 1023 via the computing process.

According to another aspect of the present invention, the performance indicators may also be determined from the conversations between the service representative 102 and the customer 104. This requires the processor 1084 of the computer system 108 to obtain a conversation between the service representative 102 and the customer 104 and determine the performance indicator of the service representative 102 based on the conversation between the service representative 102 and the customer 104.

For example, the processor 1084 of the computer system 108 identifies at least one keyword in the conversation. The at least one keyword represents a reaction from customer 104 in the conversation. The reaction may be represented by one or more positive or negative keywords in order to indicate the satisfaction level of the customer 104. Examples of at least one positive keyword (including variations of the keyword) may be, but not limited to, thank you (variations such as thanks, thankful etc.), grateful, satisfied, happy, kind, great etc. Examples of at least one negative keyword may be, but not limited to, unfair, unprofessional, complain, not good, bad, unhappy, not satisfied, frustrate etc. The at least one keyword may be present at the end of the conversation or in the middle of the conversation. This would be more clearly understood with the help of an example.

Figure 4A:
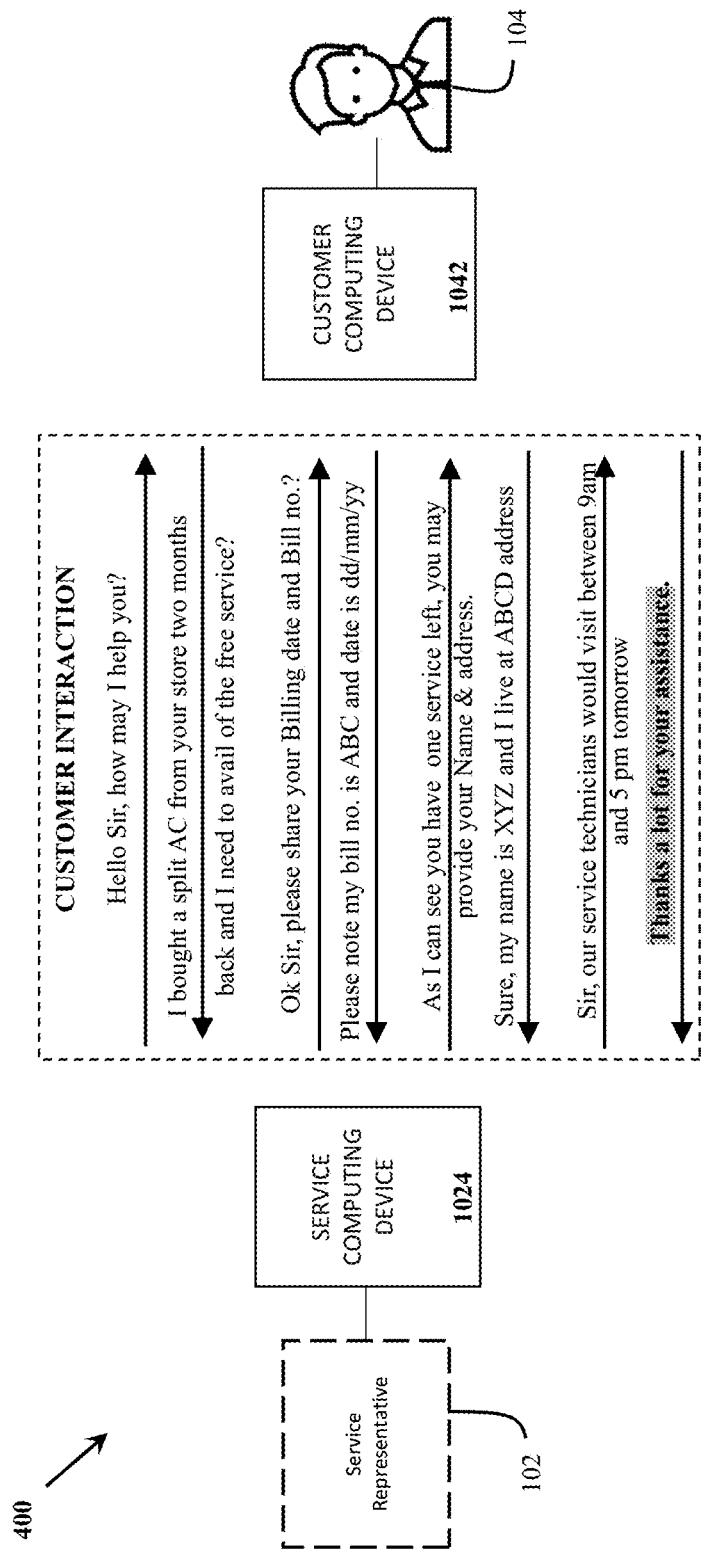
FIGS. 4A-4B illustrate exemplary conversations between the service representative and the customer for determining a performance indicator, in accordance with an embodiment of the present invention.
Figure 4B:
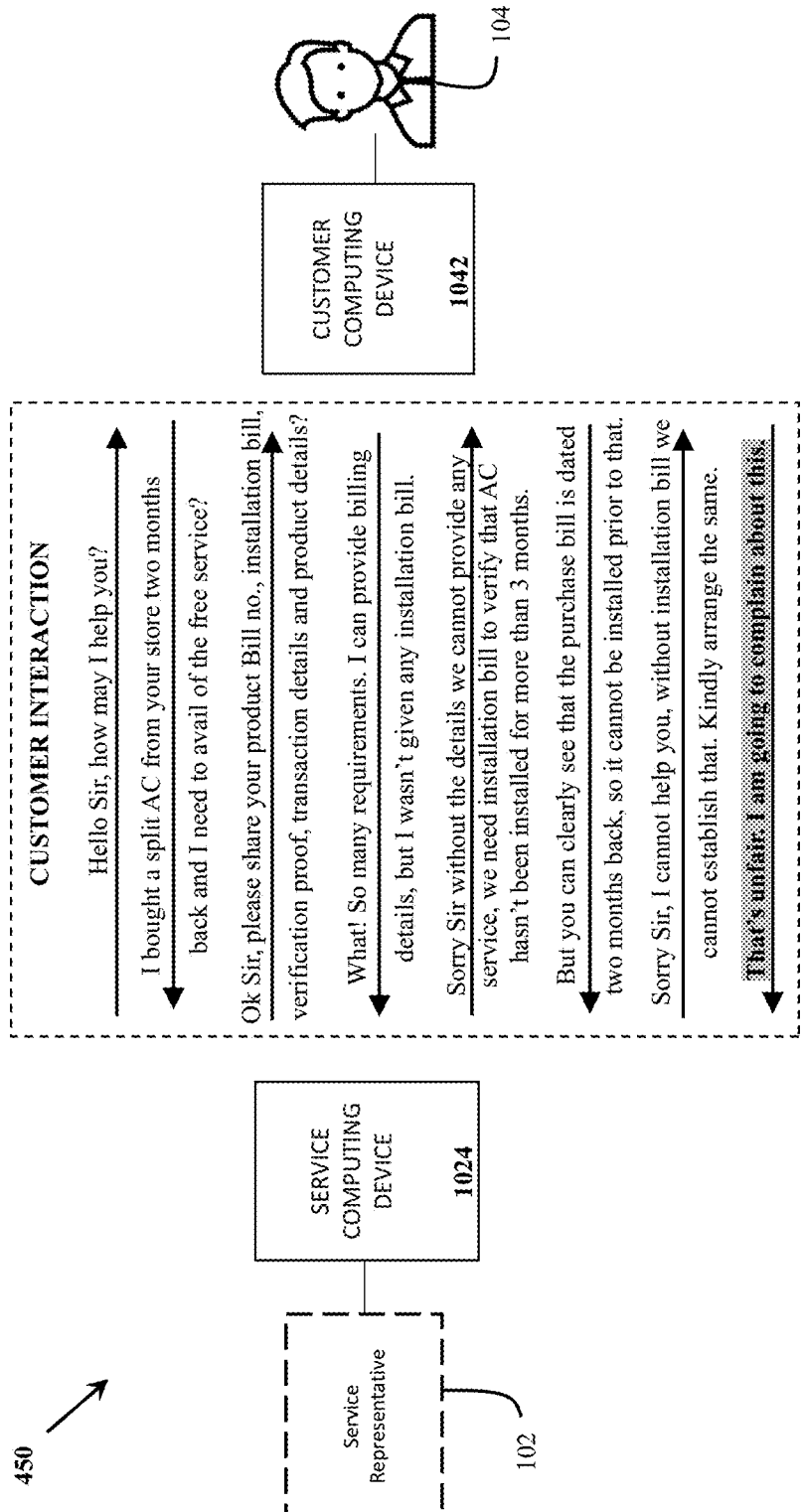

FIGS. 4A-4B illustrate exemplary conversations between the service representative 102 and the customer 104 for determining a performance indicator in accordance with an embodiment of the present invention. In both figures, the customer 104 and the service representative 102 communicate via the customer computing device 1042 and the service computing device 1024. As shown in FIG. 4A, the customer 104 has a conversation with the service representative 102 for the free service of the AC. The customer 104 ends the conversation with "Thanks a lot for your assistance". The same has been highlighted in FIG. 4A. Therefore, the processor 1084 may identify the "thanks a lot" as positive keywords and determine the performance indicator as the customer 104 seems to be happy and satisfied.

Similarly, a variation of the same conversation is shown in FIG. 4B illustrating an unsatisfied customer 104. As shown in FIG. 4B, upon receiving a request for service from the customer 104, the service representative 102 begins to ask many questions presenting unnecessary requirements, thereby irritating the customer 104. Also, the service representative 102 makes unfair arguments without paying attention to customer 104's explanations. As a result, the customer 104 ends the conversation with "That's unfair. I am going to complain about this." The same has been highlighted in FIG. 4B. The processor 1084 identifies the keywords such as "unfair", "complain" as negative keywords and determines the performance indicator as the customer 104 seems to be unhappy and unsatisfied. Therefore, the processor 1084 may initiate the computing process in order to train the service representative 102.

In accordance with an embodiment of the invention, the processor 1084 also considers the accuracy of the answers of a service representative 102 to queries of the customer 104 for determination of the performance indicator. Customer 104 ratings would be higher if the queries of the customer 104 are accurately resolved to his/her satisfaction. This requires the processor 1084 of the computer system 108 to identify a question asked by the customer 104 and an answer provided by the service representative 102 to the question. Then, accuracy of the answer to the question is determined, and the performance indicator of the service representative 102 is determined based on the accuracy of the answer to the question. This could be understood more clearly with the help of an example.

Figure 5A:
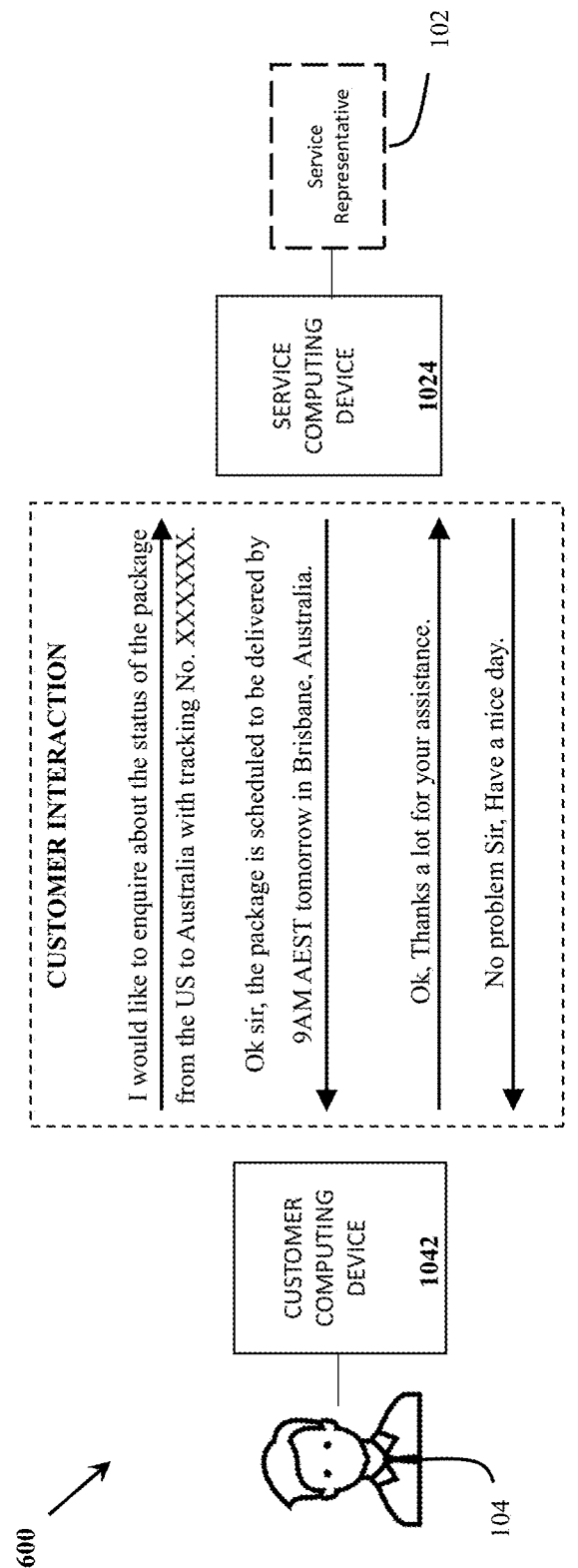
FIGS. 5A-5B illustrate exemplary conversations between the service representative and the customer for determining a performance indicator, in accordance with an embodiment of the present invention.
Figure 5B:
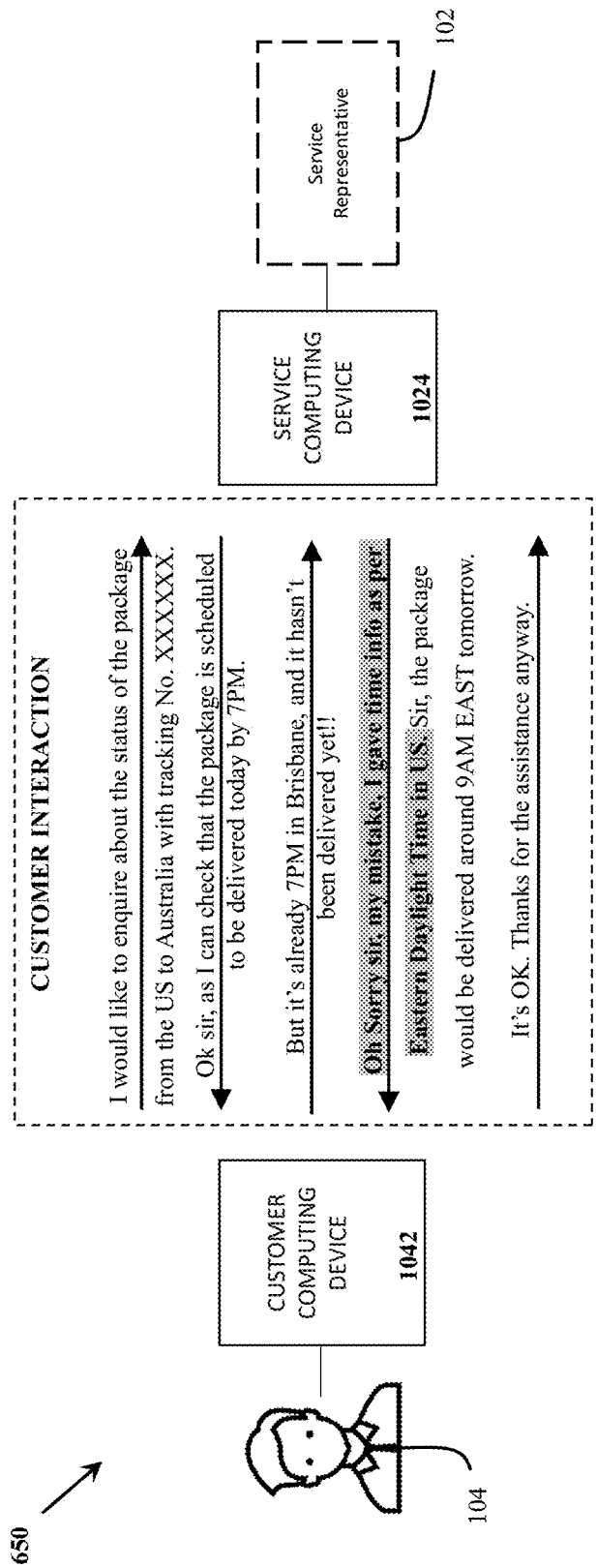

FIGS. 5A-5B illustrate exemplary conversations between the service representative 102 and the customer 104 for determining a performance indicator in accordance with an embodiment of the present invention. In both the figures, the customer 104 and the service representative 102 communicate via the customer computing device 1042 and the service computing device 1024. As shown in FIG. 5A, the customer 104 enquires about a status of a package delivered to Australia by providing the tracking number. The service representative 102 uses the tracking number to fetch information of the delivery and is also aware that the customer 104 is based in Brisbane, Australia. Therefore, the service representative 102 provides the status and the scheduled delivery time of delivery of the package in Brisbane time. This is an accurate answer in the context and receives a positive reaction from the customer 104. Therefore, the processor 1084 determines the performance indicator as the answer is accurate and the customer 104 seems to be happy and satisfied.

A similar conversation is shown in FIG. 5B indicative of a confused customer 104. As shown in FIG. 5B, the customer 104 enquires about a status of a package delivered to Australia, the service representative 102 uses the tracking number to fetch information of the delivery but did not pay attention to the fact that the customer 104 is in Brisbane, Australia and the delivery time should be provided in local time. Such an inaccurate answer is identified by the processor 1084 and the performance indicator is determined accordingly.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices. The terms and descriptions used herein are set forth by way of illustration only and are not meant as limitations. Examples and limitations disclosed herein are intended to be not limiting in any manner, and modifications may be made without departing from the spirit of the present disclosure.

Those skilled in the art will recognize that many variations are possible within the spirit and scope of the disclosure, and their equivalents, in which all terms are to be understood in their broadest possible sense unless otherwise indicated.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is meant to provide the broadest scope, consistent with the principles and the novel and inventive features disclosed or suggested herein. Accordingly, the disclosure is anticipated to hold on to all other such alternatives, modifications, and variations that fall within the scope of the present disclosure and appended claims.

The invention claimed is:

1. A computer-implemented method for improving performance of a service representative that provides services, the method comprising:
    determining a performance indicator representing performance of the service representative during provision of the services to one or more customer; and
    upon determining that the performance indicator meets a condition, starting a computing process on a computing device to interact with the service representative in order to improve the performance of the service representative provision of the services.

2. The computer-implemented method of claim 1, wherein the service representative is an online chatbot, and starting the computing process comprises:
    sending a notification to an account associated with a human agent, the notification including a reward indication indicating a reward for interacting with the online chatbot via the computing process;
    receiving a response indicating the human agent has agreed to interact with the online chatbot via the computing process;
    invoking the computing process for the human agent to interact with the online chatbot in order to improve the performance of the online chatbot; and
    storing the reward indication in the account associated with the human agent as the reward for interacting with the online chatbot via the computing process.

3. The computer-implemented method of claim 1, wherein the service representative is a human agent, and starting the computing process comprises:
    sending a notification to an account associated with the human agent, the notification including a reward indication indicating a reward for interacting with the computing process;
    receiving a response indicating the human agent has agreed to interact with the computing process;
    invoking the computing process for the human agent to interact with in order to improve the performance of the human agent; and
    storing the reward indication in the account associated with the human agent as the reward for interacting with the computing process.

4. The computer-implemented method of claim 1, wherein the service representative is a human agent, and starting the computing process comprises:
    sending a notification to an account associated with the human agent, the notification including a reward indication indicating a reward for interacting with a further human agent via the computing process;
    receiving a response indicating the human agent has agreed to interact with the further human agent via the computing process;
    invoking the computing process for the human agent to interact with the further human agent in order to improve the performance of the human agent; and
    storing the reward indication in the account associated with the human agent as the reward for interacting with the further human agent.

5. The computer-implemented method of claim 1, wherein the computing process is an electronic game operated on the computing device.

6. The computer-implemented method of claim 1, wherein determining the performance indicator of the service representative comprises determining one or more of Key Performance Indicators (KPI) comprising After Call Work (ACW), Average Handle Time (AHT), Net Promoter Score (NPS), and sales conversion rate.

7. The computer-implemented method of claim 1, wherein determining the performance indicator of the service representative comprises:
    obtaining a conversation between the service representative and a customer; and
    determining the performance indicator of the service representative based on the conversation between the service representative and the customer.

8. The computer-implemented method of claim 7, wherein determining the performance indicator of the service representative comprises:
    identifying at least one keyword in the conversation, the at least one keyword representing a reaction from the customer in the conversation;
    determining the performance indicator of the service representative based on the at least one keyword in the conversation.

9. The computer-implemented method of claim 7, wherein determining the performance indicator of the service representative comprises:
    identifying a question asked by the customer and an answer provided by the service representative to the question;
    determining accuracy of the answer to the question; and
    determining the performance indicator of the service representative based on the accuracy of the answer to the question.

10. A computer system for improving performance of a service representative that provides services, the computer system comprising:
    a memory unit configured to store machine-readable instructions; and
    a processor operably connected with the memory unit, the processor obtaining the machine-readable instructions from the memory unit;
    wherein the processor is configured by the machine-readable instructions to:
        determine a performance indicator representing performance of the service representative during provision of the services to one or more customer; and
        upon determining that the performance indicator meets a condition, start a computing process on a computing device to interact with the service representative in order to improve the performance of the service representative in provision of the services.

11. The computer system of claim 10, wherein the service representative is an online chatbot, and the processor is configured to start the computing process by:

sending a notification to an account associated with a human agent, the notification including a reward indication indicating a reward for interacting with the online chatbot via the computing process;

receiving a response indicating the human agent has agreed to interact with the online chatbot via the computing process;

invoking the computing process for the human agent to interact with the online chatbot in order to improve the performance of the online chatbot; and storing the reward indication in the account associated with the human agent as the reward for interacting with the online chatbot via the computing process.

12. The computer system of claim 10, wherein the service representative is a human agent, and the processor is configured to start the computing process by:

sending a notification to an account associated with the human agent, the notification including a reward indication indicating a reward for interacting with the computing process;

receiving a response indicating the human agent has agreed to interact with the computing process;

invoking the computing process for the human agent to interact with in order to improve the performance of the human agent; and storing the reward indication in the account associated with the human agent as the reward for interacting with the computing process.

13. The computer system of claim 10, wherein the service representative is a human agent, and the processor is configured to start the computing process by:

sending a notification to an account associated with the human agent, the notification including a reward indication indicating a reward for interacting with a further human agent via the computing process;

receiving a response indicating the human agent has agreed to interact with the further human agent via the computing process;

invoking the computing process for the human agent to interact with the further human agent in order to improve the performance of the human agent; and storing the reward indication in the account associated with the human agent as the reward for interacting with the further human agent.

14. The computer system of claim 10, wherein the computing process is an electronic game operated on the computing device.

15. The computer system of claim 10, wherein the processor is configured to determine the performance indicator of the service representative by determining one or more of Key Performance Indicators (KPI) comprising After Call Work (ACW), Average Handle Time (AHT), Net Promoter Score (NPS), and sales conversion rate.

16. The computer system of claim 10, wherein the processor is configured to determine the performance indicator of the service representative by:

obtaining a conversation between the service representative and a customer; and determining the performance indicator of the service representative based on the conversation between the service representative and the customer.

17. The computer system of claim 16, wherein the processor is configured to determine the performance indicator of the service representative by:

identifying at least one keyword in the conversation, the at least one keyword representing a reaction from the customer in the conversation; and determining the performance indicator of the service representative based on the at least one keyword in the conversation.

18. The computer system of claim 16, wherein the processor is configured to determine the performance indicator of the service representative by:

identifying a question asked by the customer and an answer provided by the service representative to the question;

determining accuracy of the answer to the question; and determining the performance indicator of the service representative based on the accuracy of the answer to the question.

19. A non-transitory computer readable medium storing a set of computer readable instructions, the set of computer readable instructions configuring a computing device to perform the method of claim 1.

20. The computer system of claim 15, wherein:

when the performance indicator is Average Handle Time (AHT), the condition is AHT is higher than 30 minutes, when the performance indicator is Net Promoter Score (NPS), the condition is NPS is lower than 10, and when the performance indicator is sales conversion rate, the condition is sales conversion rate is less than 20%.

21. The computer-implemented method of claim 6, wherein:

when the performance indicator is Average Handle Time (AHT), the condition is AHT is higher than 30 minutes, when the performance indicator is Net Promoter Score (NPS), the condition is NPS is lower than 10, and when the performance indicator is sales conversion rate, the condition is sales conversion rate is less than 20%.

* * * * *